United States Patent
Morimura et al.

(10) Patent No.: US 10,421,394 B2
(45) Date of Patent: Sep. 24, 2019

(54) DRIVING ASSISTANCE DEVICE, AND STORAGE MEDIUM

(71) Applicant: TOYOTA JIDOSHA KABUSHIKI KAISHA, Toyota-shi, Aichi-ken (JP)

(72) Inventors: Junichi Morimura, Shizuoka-ken (JP); Junya Watanabe, Shizuoka-ken (JP); Seiji Arakawa, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/044,670

(22) Filed: Jul. 25, 2018

(65) Prior Publication Data
US 2019/0047468 A1 Feb. 14, 2019

(30) Foreign Application Priority Data
Aug. 9, 2017 (JP) .................. 2017-154078

(51) Int. Cl.
| B60Q 1/34 | (2006.01) |
| B60W 30/18 | (2012.01) |
| G06K 9/00 | (2006.01) |
| G05D 1/00 | (2006.01) |
| G08G 1/16 | (2006.01) |
| B60Q 1/50 | (2006.01) |

(52) U.S. Cl.
CPC .............. *B60Q 1/346* (2013.01); *B60Q 1/50* (2013.01); *B60W 30/18163* (2013.01); *G05D 1/0088* (2013.01); *G06K 9/00805* (2013.01); *G08G 1/167* (2013.01); *B60W 2720/10* (2013.01); *B60W 2720/12* (2013.01); *G05D 2201/0213* (2013.01)

(58) Field of Classification Search
CPC ....... B60W 30/18163; B60W 2720/10; B60W 2720/12; G05D 1/0088; G05D 2201/0213; G06K 9/00805; G08G 1/167
USPC .......................................................... 340/468
See application file for complete search history.

(56) References Cited

U.S. PATENT DOCUMENTS

| 8,954,252 | B1 * | 2/2015 | Urmson ................. G08G 1/166 180/167 |
| 9,196,164 | B1 | 11/2015 | Urmson et al. |
| 2013/0184980 | A1 | 7/2013 | Ichikawa et al. |
| 2014/0062685 | A1 | 3/2014 | Tamatsu et al. |

(Continued)

FOREIGN PATENT DOCUMENTS

| JP | 2012-130986 A | 7/2012 |
| JP | 2014-046838 A | 3/2014 |
| JP | 2016-031660 A | 3/2016 |

(Continued)

*Primary Examiner* — Travis R Hunnings
*Assistant Examiner* — Sharmin Akhter
(74) *Attorney, Agent, or Firm* — Sughrue Mion, PLLC

(57) ABSTRACT

A driving assistance device for assisting driving a vehicle includes a non-congested state calculation unit and an intent notification control unit. The non-congested state calculation unit is configured to calculate a non-congested state of a plurality of dynamic obstacles around the vehicle. The intent notification control unit is configured to control a notification device such that a notification of intent of the vehicle to pass is performed based on the non-congested state calculated by the non-congested state calculation unit after the vehicle has decelerated or stopped.

8 Claims, 6 Drawing Sheets

(56) References Cited

U.S. PATENT DOCUMENTS

2016/0121791 A1\* 5/2016 Shimizu ................ G08G 1/166
340/435

FOREIGN PATENT DOCUMENTS

| JP | 2016-166013 A | 9/2016 |
| JP | 2017-004471 A | 1/2017 |
| WO | 2012/039280 A1 | 3/2012 |

\* cited by examiner

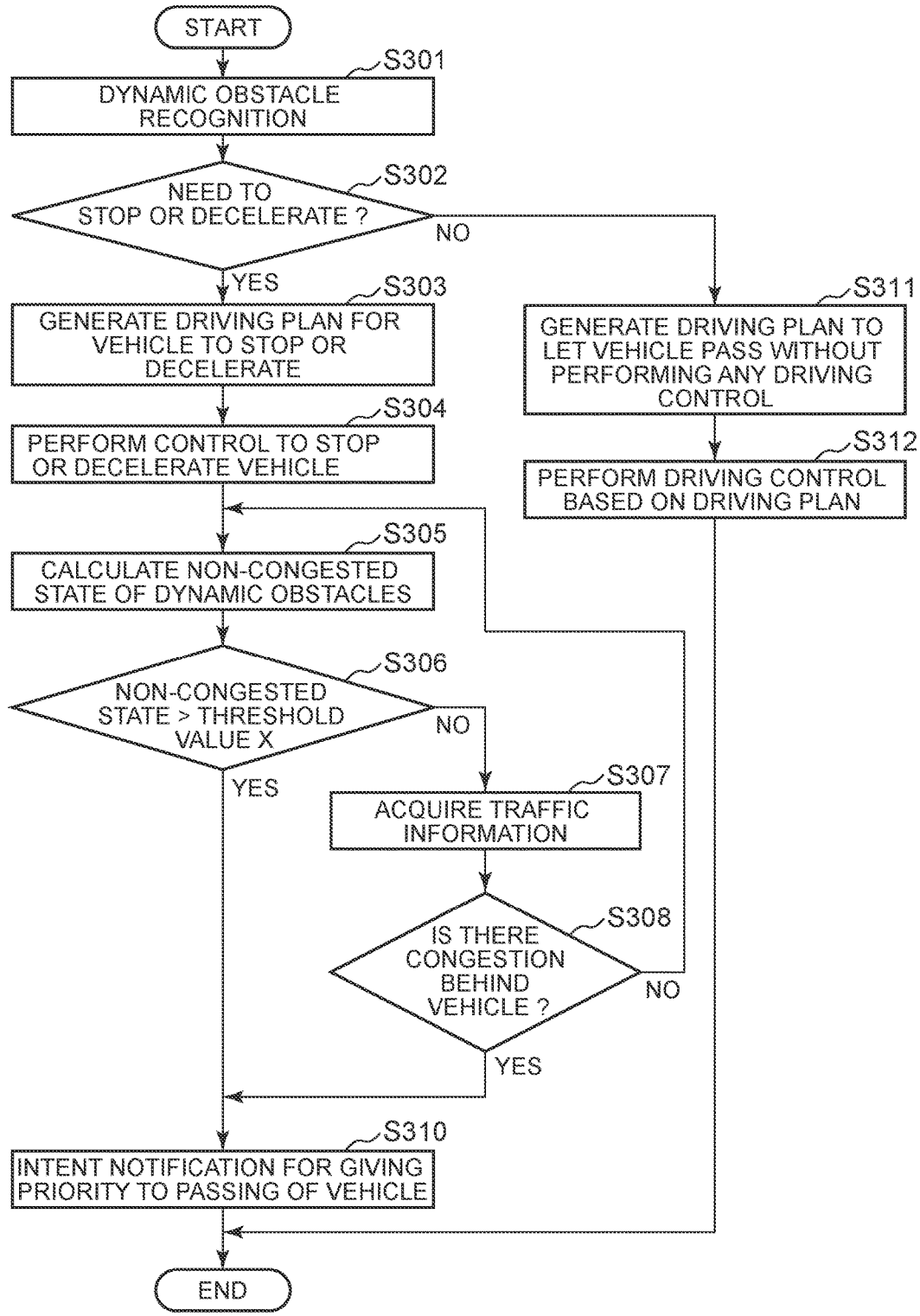

DRIVING ASSISTANCE DEVICE, AND STORAGE MEDIUM

INCORPORATION BY REFERENCE

The disclosure of Japanese Patent Application No. 2017-154078 filed on Aug. 9, 2017 including the specification, drawings and abstract is incorporated herein by reference in its entirety.

BACKGROUND

1. Technical Field

The present disclosure relates to a driving assistance device, and a storage medium.

2. Description of Related Art

An autonomous vehicle disclosed in U.S. Pat. No. 9,196,164 has been known. This autonomous vehicle has a function of notifying a pedestrian around the autonomous vehicle of a plan of action of the vehicle by sound, visual display, or the like. For the surrounding pedestrian detected by the autonomous vehicle, the autonomous vehicle may select one of the following plans of action: (1) to stop the vehicle and yield to the pedestrian; (2) to decelerate the vehicle and yield to the pedestrian; and (3) to continue to drive without yielding to the pedestrian. The autonomous vehicle has a function of notifying the surrounding pedestrian of a plan of action selected from the above three plans of action.

SUMMARY

The above related art publication discloses that one dynamic obstacle, such as a pedestrian, is notified of a plan of action of the autonomous vehicle. However, this publication does not disclose how to cope with a situation where a plurality of dynamic obstacles, such as a group of pedestrians, is present around the vehicle.

With the autonomous vehicle disclosed in the above related art publication, when a plurality of dynamic obstacles are present around the vehicle, it is difficult to select a plan of action to continue to drive without yielding to pedestrians. Thus, the autonomous vehicle selects a plan of action to yield to the dynamic obstacles and notifies the plan of action to the dynamic obstacles, repeatedly. In this case, there is a concern that the vehicle cannot pass through an area where a plurality of dynamic obstacles are present or the vehicle will require a long time to pass through such an area.

A first aspect of the present disclosure relates to a driving assistance device for assisting driving a vehicle. The driving assistance device includes an a non-congested state calculation unit configured to calculate a non-congested state of a plurality of dynamic obstacles around the vehicle, and an intent notification control unit configured to control a notification device for performing a notification of intent of the vehicle to pass based on the non-congested state calculated by the non-congested state calculation unit after the vehicle has decelerated or stopped.

With the driving assistance device, whenever the surrounding dynamic obstacles are in a non-congested state, the driving assistance device performs a notification of intent to pass to give priority to the passing of the vehicle, thereby making it possible to reduce the time required for the vehicle to pass.

The driving assistance device according to the first aspect may further include a vehicle behavior control unit configured to control behavior of the vehicle based on the non-congested state of the plurality of dynamic obstacles. Controlling behavior of the vehicle makes it possible to provide a stronger notification of intent to pass compared when the intent notification is only provided by the intent notification control unit.

In the driving assistance device according to the first aspect, the vehicle behavior control unit may also control the vehicle behavior for the vehicle to move forward at a vehicle speed equal to or lower than a predetermined speed. By making the vehicle move forward at a low speed, the driving assistance device may provide a strong notification of intent to pass to prompt the plurality of dynamic obstacles to yield a path to the vehicle so that the vehicle may securely pass an area where the plurality of dynamic obstacles are present.

The driving assistance device according to the first aspect may further include a traffic information acquisition unit that acquires traffic information on traffic around the vehicle. The intent notification control unit may further control the notification of intent of the vehicle to pass based on information on traffic around the vehicle. In this case, the time required for the vehicle to pass may be reduced by considering the surrounding traffic information.

In the driving assistance device according to the first aspect, the non-congested state calculation unit may also calculate the non-congested state by using the number of dynamic obstacles present in a predetermined region around the vehicle.

In the driving assistance device according the first aspect, the intent notification control unit may also perform a control of a notification of intent to yield to the dynamic obstacles before the non-congested state of the plurality of dynamic obstacles is calculated.

The driving assistance device according to the first aspect may further includes an external state recognition unit configured to recognize the plurality of dynamic obstacles around the vehicle and a driving control unit configured to perform a driving control of the vehicle based on a recognition result of the external state recognition unit. The driving control unit may decelerate or stop the vehicle.

A second aspect of the present disclosure relates to a computer readable storage medium in which a program is stored. The program includes instructions that, when executed by a processor, cause the processor to calculate a non-congested state of a plurality of dynamic obstacles around a vehicle and control a notification device for performing a notification of intent of the vehicle to pass based on the calculated non-congested state after the vehicle has decelerated or stopped.

In the driving assistance method, whenever the dynamic obstacles are in a non-congested state after a vehicle decelerates or stops, the driving assistance device performs the notification of intent to pass to give priority to the passing of the vehicle, thereby making it possible to reduce the time required for the vehicle to pass.

According to the present disclosure, even when a plurality of dynamic obstacles, such as pedestrians, are present around a vehicle, the vehicle may pass therethrough, or the time required for the vehicle to pass may be reduced compared to a conventional notification method.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating an example of an operation performed by the driving assistance device of the third embodiment.

DETAILED DESCRIPTION OF EMBODIMENTS

First Embodiment

Figure 1:
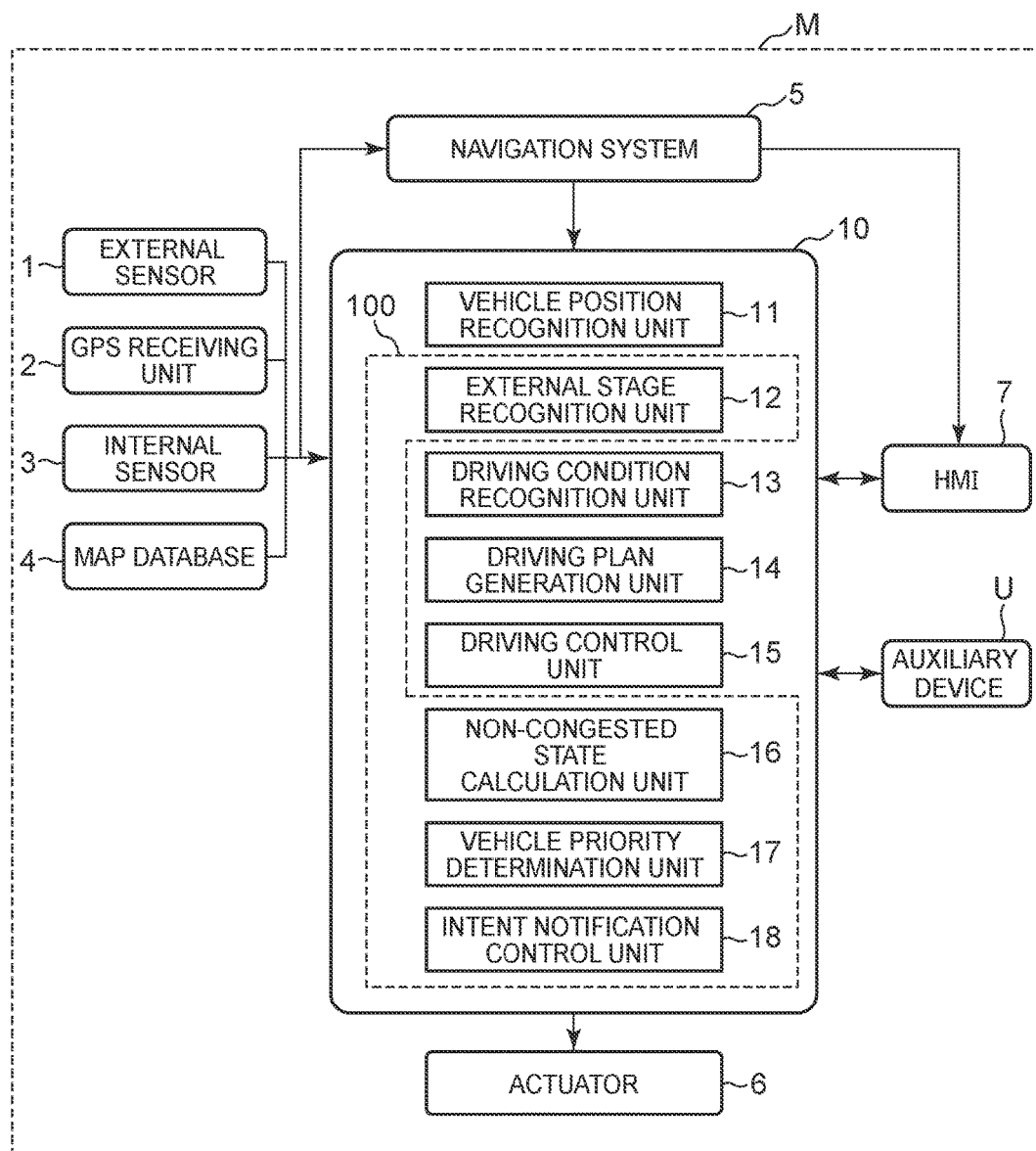
FIG. 1 is a block diagram illustrating the configuration of a driving assistance device of a first embodiment.

FIG. 1 is a block diagram illustrating the configuration of a driving assistance device according to a first embodiment. As shown in FIG. 1, the driving assistance device 100 according to the first embodiment is a control device provided in a vehicle M, such as an automobile, and is for performing driving assistance control of the vehicle M. The driving assistance device 100 determines whether driving assistance is possible. When the driving assistance device 100 determines that driving assistance is possible or when an operation to start the driving assistance control is performed by a driver (e.g., an operation of pressing a start button of an autonomous driving control, etc.), the driving assistance device 100 starts the driving assistance control of the vehicle M. Examples of the driving assistance control include driving assistance by control of vehicle speed and a vehicle steering assistance control. The driving assistance control may also be only for providing information to the driver of the vehicle M. The case of autonomous driving control will be described hereinbelow. The autonomous driving control refers to a vehicle control to autonomously drive the vehicle M along a preset target route. Under the autonomous driving control, the vehicle M autonomously travels without requiring the driver to perform a driving operation. The target route refers to a route on a map along which the vehicle M moves in the autonomous driving control.

The driving assistance device 100 is composed of, for example, an ECU 10 configured to perform an autonomous driving control. The ECU 10 is an electronic control unit including, for example, a central processing unit (CPU), a read-only memory (ROM), a random access memory (RAM), and a controller area network (CAN) communication circuit. The ECU 10 implements various functions by loading a program stored in a ROM onto a RAM and executing the program loaded onto the RAM by means of a CPU. The ECU 10 may also be composed of a plurality of electronic control units. The ECU 10 is connected to an external sensor 1, a GPS receiving unit 2, an internal sensor 3, a map database 4, a navigation system 5, an actuator 6, a human machine interface (HMI) 7, and an auxiliary device U.

The external sensor 1 is, for example, a detection device for detecting an external state around the vehicle M. The external sensor 1 includes at least one of a camera, a radar, and a light imaging detection and ranging (LIDAR). The external sensor 1 is also used to recognize a white line of a driving lane along which the vehicle M travels (which will be described later). The external sensor 1 may be used to measure the position of the vehicle M. The external sensor 1 may include an ultrasonic sensor as means to detect the external state around the vehicle M.

A camera is an image capture device for capturing the external state of the vehicle. The camera is provided at the back side of the windshield of the vehicle M. The camera may also be provided at the right and left sides of the vehicle M and the rear side of the vehicle. The camera sends imaging information captured in the front of the vehicle M to the ECU 10. The camera may be a monocular camera or a stereo camera. The stereo camera has two imaging units arranged for reproducing binocular disparity.

The radar detects obstacle(s) around the vehicle M by using electric waves (e.g., millimeter waves). The radar detects the obstacle by sending electric waves to the periphery of the vehicle M and receiving the electric waves reflected from an obstacle. The radar sends information on the detected obstacle to the ECU 10. Obstacles include fixed obstacles (e.g., curbstones, electric poles, poles, guardrails, walls, buildings, roadside signboards, and traffic signs) and dynamic obstacles (e.g., pedestrians, bicycles, and other vehicles).

The LIDAR detects an obstacle at the exterior of the vehicle M by using light. The LIDAR detects the obstacle by sending light to the periphery of the vehicle M, receiving light reflected from the obstacle, and measuring a distance to a reflection point. The LIDAR sends the information on the detected obstacle to the ECU 10. It is not necessary to provide both the LIDAR and the radar.

The ultrasonic sensor detects an external obstacle near the vehicle M by using ultrasonic waves. The ultrasonic sensor detects the obstacle by sending ultrasonic waves to the periphery of the vehicle M, receiving ultrasonic waves reflected from the obstacle, and measuring the distance to the reflection point. The ultrasonic sensor sends the information on the detected obstacle to the ECU 10.

The GPS receiving unit 2 is provided in the vehicle M and functions as a position measurement unit for measuring the position of the vehicle M. The GPS receiving unit 2 measures the position of the vehicle M (e.g., the latitude and longitude of the vehicle M) by receiving signals from three or more GPS satellites. The GPS receiving unit 2 sends information on the measured position of the vehicle M to the ECU 10.

The internal sensor 3 is a detection device for detecting the vehicle state of the vehicle M. The internal sensor 3 includes a vehicle speed sensor, an acceleration sensor, and a yaw rate sensor. The vehicle speed sensor is a detector for detecting the vehicle speed of the vehicle M. The vehicle speed sensor may be used as a wheel speed sensor that is provided for a wheel of the vehicle M, a drive shaft integrally rotating with the wheel, or the like to detect the wheel rotation speed. The vehicle speed sensor sends information on the detected vehicle speed to the ECU 10.

The internal sensor 3 may include a steering angle sensor. The steering angle sensor is a sensor for detecting the steering angle (actual steering angle) of the vehicle M. The steering angle sensor is provided on the steering shaft of the vehicle M. The steering angle sensor sends information on the detected steering angle to the ECU 10.

The acceleration sensor is a detector for detecting the acceleration of the vehicle M. The acceleration sensor includes a front-and-rear acceleration sensor for detecting the acceleration in the front-and-rear directions of the vehicle M and a lateral acceleration sensor for detecting the lateral acceleration of the vehicle M. The acceleration sensor sends the acceleration information of the vehicle M to the ECU 10. The yaw rate sensor is a detector for detecting a yaw rate (rotation angle speed) of the vehicle M around the vertical axis of the center of gravity. The yaw rate sensor may be a gyro sensor. The yaw rate sensor sends information on the detected yaw rate of the vehicle M to the ECU 10.

The map database 4 is a database for storing map information. The map information may include information on the position of a fixed obstacle. The map information may include information on the position of white lines provided on a road. The map database 4 is provided in a hard disk drive (HDD) included in the vehicle M. The map database 4 may access a server of a map information control center via wireless communication and may periodically update the map information using the latest map information stored in the server of the map information control center. The map database 4 does not necessarily need to be provided in the vehicle M. The map database 4 may be provided in a server capable of communicating with the vehicle M, for example.

The map database 4 may store traffic rule-related information such as vehicle stop lines, pedestrian crosswalks, traffic signals, or speed limit information.

The navigation system 5 is provided in the vehicle M and sets a target route along which the vehicle M travels under the autonomous driving control. The navigation system 5 calculates a target route from the position of the vehicle M to a destination based on a preset destination, the position of the vehicle M measured by the GPS receiving unit 2, and the map information of the map database 4. The destination under the autonomous driving control is set by operation of an input button (or a touch panel) provided in the navigation system 5 by a passenger of the vehicle M. The navigation system 5 may set the target route by a well-known method. The navigation system 5 may have a function to guide the vehicle along the target route when the vehicle M is driven manually by a driver. The navigation system 5 sends information on the target route of the vehicle M to the ECU 10. The navigation system 5 may be configured such that the function thereof may be partially performed by a server of a facility, such as an information processing center that can communicate with the vehicle M. The function of the navigation system 5 may be performed by the ECU 10.

The target route also includes a target route autonomously generated based on past destination history or map information when the destination is not clearly set by the driver.

The actuator 6 is an apparatus for controlling the driving of the vehicle M. The actuator 6 is one example of a vehicle behavior control unit. The actuator 6 at least includes an engine actuator, a brake actuator, and a steering actuator. The engine actuator controls the driving force of the vehicle M by controlling the amount of air supplied to the engine (throttle opening) in response to a control signal from the ECU 10. When the vehicle M is a hybrid vehicle, the driving force is controlled not only based on the amount of air supplied to the engine but also based on a control signal input from the ECU 10 to a motor that functions as a power source. When the vehicle M is an electric car, the driving force is controlled based on a control signal input from the ECU 10 to the motor that functions as a power source.

The brake actuator controls the braking force administered to the wheels of the vehicle M by controlling the brake system in response to the control signal from the ECU 10. The brake system may be a liquid pressure brake system. The steering actuator controls the driving of an assist motor of the electric power steering system for controlling the steering torque in response to the control signal from the ECU 10. In this manner, the steering actuator controls the steering torque of the vehicle M.

The HMI 7 is an interface for inputting and outputting information between a passenger of the vehicle M (including a driver) and the driving assistance device 100. The HMI 7 includes, for example, a display panel for displaying image information for a passenger, a speaker for outputting audio, and an operation button or a touch panel for an input operation by a passenger. When the passenger performs an input operation to start or stop the autonomous driving, the HMI 7 outputs a signal to the ECU 10, and starts or stops the autonomous driving. When a destination at which the autonomous driving is to turn off is reached, the HMI 7 notifies the passenger that the destination has been reached. The HMI 7 may output the information to the passenger using a wirelessly-connected mobile information terminal or may receive an input operation by the passenger using a wirelessly-connected mobile information terminal.

The auxiliary device U may be recognized from the exterior of the vehicle M. The term auxiliary device U is a generic term for the devices that the actuator 6 does not include. For example, the auxiliary device U includes turn signals, headlights, windshield wipers, speakers, and displays.

In the below description, the functional configuration of the ECU 10 will be described. The ECU 10 includes a vehicle position recognition unit 11, an external state recognition unit 12, a driving condition recognition unit 13, a driving plan generation unit 14, a driving control unit 15, a non-congested state calculation unit 16, a vehicle priority determination unit 17, and an intent notification control unit 18.

The vehicle position recognition unit 11 recognizes the position of the vehicle M on the map based on the position information of the GPS receiving unit 2 and the map information of the map database 4. The vehicle position recognition unit 11 may also compensate for the accuracy of the position and direction of the vehicle M by comparing the detection result by the external sensor 1 or the external state recognized by the external state recognition unit 12 (which will be described later) with the map information. For example, the vehicle position recognition unit 11 may also recognize the position of the vehicle M by the conventional SLAM technique using the position information of a fixed obstacle, such as an electric pole, etc., included in the map information of the map database 4 and the detection result by the external sensor 1.

The external state recognition unit 12 recognizes the external state of the vehicle M based on the detection result by the external sensor 1. The external state recognition unit 12 may recognize the external state of the vehicle M including the positions of obstacles around the vehicle M by a well-known method based on an image captured by the camera and/or the obstacle information from the radar. The external state recognition unit 12 may also recognize a dynamic obstacle around the vehicle M. The term dynamic obstacle refers to a moving or moveable obstacle such as a human, a bicycle, or other vehicles, etc. The dynamic obstacle may be distinguished from a static obstacle and be tracked by a well-known method such as pattern matching, etc. In addition, the external state recognition unit 12 may recognize a relative speed between the dynamic obstacle and the vehicle M by a well-known method such as a radar Doppler method or the measurement of changes in relative position over time. The external state recognition unit 12 may also recognize the position of a white line of a driving lane or the position of a traffic sign on a road surface relative to the vehicle M, or the position of the center of a traffic lane and the road width, or the road shape (e.g., a curvature of the driving lane, a change in the road surface gradient, or an undulating road surface) based on the image captured by the camera.

The driving condition recognition unit 13 recognizes the driving condition of the vehicle M including the vehicle speed and direction of the vehicle M based on the detection result by the internal sensor 3. Specifically, the driving condition recognition unit 13 recognizes the vehicle speed of the vehicle M based on the vehicle speed information from the vehicle speed sensor. The driving condition recognition unit 13 recognizes the direction of the vehicle M based on the yaw rate information from the yaw rate sensor.

The driving plan generation unit 14 generates the driving plan of the vehicle M based on the target route set by a navigation system 5, the map information from the map database 4, the external state of the vehicle M recognized by the external state recognition unit 12, and the driving condition of the vehicle M recognized by the driving condition recognition unit 13. This driving plan is for moving the vehicle M from its current position to a preset destination.

The driving plan includes a control target value of the vehicle M depending on the position of the vehicle M on the target route. The position on the target route is a position on the map in a direction along which the target route extends. The position on the target route refers to a longitudinal position set for each predetermined interval (e.g., 1 m) in a direction along which the target route extends. The control target value is a value used as a control target of the vehicle M in the driving plan. The control target value is set in relation to each set longitudinal position of the target route. The driving plan generation unit 14 generates the driving plan by setting longitudinal positions on the target route with a predetermined interval and setting a control target value for each longitudinal position (e.g., the target lateral position and the target vehicle speed). The set longitudinal position and the target lateral position may be collectively set as one position coordinate. The set longitudinal position and the target lateral position refer to information on the longitudinal position and the lateral position set as a target in the driving plan.

For example, when a dynamic obstacle is recognized by the external state recognition unit 12, the driving plan generation unit 14 generates the driving plan of the vehicle M such that the dynamic obstacle does not interfere with the vehicle M. In this case, the driving plan may be generated such that the target vehicle speed of the vehicle M is reduced at the periphery of the dynamic obstacle or the vehicle M stops at the periphery of the dynamic obstacle (i.e., such that the target vehicle speed is 0).

The driving control unit 15 executes the autonomous driving control including a speed control and a steering control of the vehicle M based on the position of the vehicle M on the map recognized by the vehicle position recognition unit 11 and the driving plan generated by the driving plan generation unit 14. The driving plan is generated by the driving plan generation unit 14 and is for moving the vehicle to a preset destination or an alternative destination. The driving control unit 15 executes the autonomous driving control by sending a control signal to the actuator 6. As the driving control unit 15 performs the autonomous driving control, the driving state of the vehicle M changes into the autonomous driving state. The control performed by the driving control unit 15 may be driving assistance control including either speed control or steering control of the vehicle M instead of the autonomous driving control.

The non-congested state calculation unit 16 calculates the non-congested state of the dynamic obstacle based on the recognition result by the external state recognition unit 12. An index showing the non-congested state of the dynamic obstacle(s) may be, for example, the number of dynamic obstacle(s) in a predetermined region around the vehicle recognized by the external state recognition unit 12. In this case, the predetermined region may be set as, for example, a region located in a direction along which the vehicle travels. Also, the non-congested state calculation unit 16 may set the distance from the vehicle M to the predetermined region or the size or shape of the predetermined region based on, for example, the vehicle speed of the vehicle M or time-to-collision (TTC) obtained by dividing the relative distance (Dr) between the vehicle M and the dynamic obstacle by a relative velocity (Vr).

In addition, the non-congested state calculation unit 16 may calculate the current non-congested state, or may predict the position of the dynamic obstacle after a predetermined time based on the detection result by the external sensor 1, and calculate the non-congested state after the predetermined time. When the non-congested state calculation unit 16 calculates the non-congested state after the predetermined time, the predetermined time may be determined depending on, for example, the vehicle speed of the vehicle M or the time to collision (TTC) of the vehicle M to the dynamic obstacle.

Figure 3:
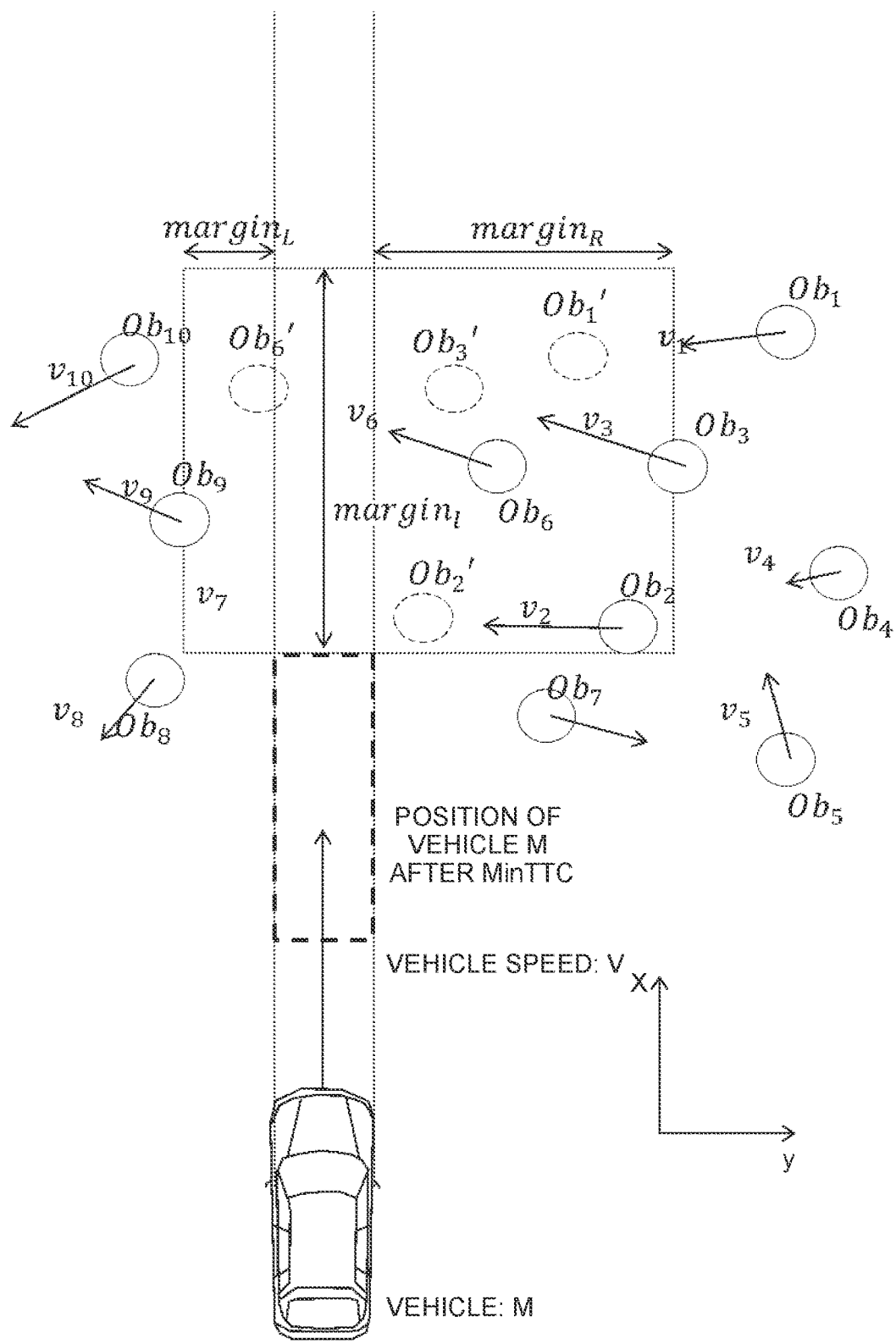
FIG. 3 illustrates an example of a non-congested state index calculated by the non-congested state calculation unit of the first embodiment.

FIG. 3 illustrates one example of the calculation by the non-congested state calculation unit 16 of the index of the non-congested state of the dynamic obstacle after the predetermined time. The vehicle M shown in FIG. 3 is moving in a direction approaching a group of dynamic obstacles (Ob1, Ob2, . . . , Obi, . . . , Obn). The dynamic obstacles (Ob1, Ob2, . . . , Obi . . . , Obn) are moving at a speed $v_i$, respectively. The non-congested state calculation unit 16 calculates the TTC (TTCi) of the vehicle M and each dynamic obstacle (Obi) when the vehicle M moves at the vehicle speed V and obtains the minimum TTCi (MinTTC) among the calculated values. As an index of the non-congested state, the calculation may use the number of dynamic obstacles present in the region having a predetermined width (MarginL, MarginR) and a predetermined length (MarginI) from the position of the vehicle M after MinTTC (seconds). In the example of FIG. 3, there are four dynamic obstacles Ob1', Ob2', Ob3', and Ob6' in the region after MinTTC (seconds) (Ob1', Ob2', Ob3', and Ob6' indicate Ob1, Ob2, Ob3, and Ob6 after MinTTC(s), respectively).

The index showing the non-congested state of the dynamic obstacles may be, for example, a ratio of an area occupied by dynamic obstacles within a predetermined region. The non-congested state of the dynamic obstacle may also be calculated without needing to define the predetermined region and may be calculated by using the entire region of the detectable range of the external sensor 1. Because the detectable range of the external sensor 1 varies depending on the conditions around the vehicle M (e.g., weather, whether there is any interference, etc.), the index of the non-congested state may also be calculated only when the detectable range is equal to or larger than a predetermined range.

The non-congested state calculation unit 16 does not always have to perform the calculation during the driving of the vehicle M. For example, the calculation may be performed after the driving plan generation unit 14 generates a driving plan to decelerate or stop the vehicle M around the dynamic obstacle or after the driving control unit 15 performs the control of decelerating or stopping the vehicle M.

The vehicle priority determination unit 17 determines whether or not to give priority to the passing of the vehicle M based on the non-congested state calculated by the non-congested state calculation unit 16. To give priority to the passing of the vehicle indicates that, when a dynamic obstacle is present around the vehicle M, the passing of the vehicle M is given priority over the dynamic obstacle. Also, the vehicle priority determination unit 17 for dynamic obstacles may perform the determination based on a comparison of the index of the non-congested state with a predetermined threshold value. For example, the vehicle priority determination unit 17 determines to give priority to the passing of the vehicle M when the number of dynamic obstacles present in the predetermined region around the vehicle at that moment of time or after a predetermined time is equal to or lower than a predetermined threshold value, which is a non-congested state.

In this embodiment, the vehicle priority determination unit 17 determines whether to give priority to the passing of the vehicle M after the vehicle M decelerates or stops as the external state recognition unit 12 recognizes a dynamic obstacle.

The threshold value used in the determination by the vehicle priority determination unit may vary depending on the map information of the map database 4, the external state of the vehicle M recognized by the external state recognition unit 12, the driving condition of the vehicle M recognized by the driving condition recognition unit 13, or the driving plan of the vehicle M generated by the driving plan generation unit 14, etc. For example, when the threshold value varies based on the map information, the threshold value may be set to be higher in an urban area than in a suburb based on whether the current position is in an urban area or a suburb. When the driving condition recognition unit recognizes that the vehicle M has not stopped, the threshold value may be set to be lower than the case where the vehicle M has stopped.

The intent notification control unit 18 controls the notification device, when the vehicle priority determination unit 17 determines to give priority to the passing of the vehicle M, to perform the intent to pass notification to give priority to the passing of the vehicle M. The notification device may be, for example, the auxiliary device U or the actuator 6. The intent to pass notification method for giving priority to the passing of the vehicle M may be based on, for instance, a notification of the intent to pass by a notification using audio or light through the auxiliary device U or a notification to the dynamic obstacles around the vehicle M by using a change in the vehicle behavior, etc. In addition, for the intent notification for giving priority to the passing of the vehicle M, the intent notification control unit 18 may send a control command to at least one of the driving plan generation unit, the driving control unit 15, and the actuator 6 to drive the vehicle M at low speed.

For the intent notification for giving priority to the passing of the vehicle M, if the vehicle M moves at low speed, the intent can be conveyed more reliably.

The intent notification control unit 18 sends a control command value to the auxiliary device U, the driving control unit 15, or the actuator 6 as appropriate depending on the intent notification method.

The intent notification control unit 18 may also perform a control, when the vehicle priority determination unit 17 determines to not give priority to the passing of the vehicle M, to provide the intent notification to give priority to the passing of the dynamic obstacle to the exterior of the vehicle M. In this case, the intent notification control unit 18 may also perform a control to provide the intent notification to give priority to the passing of the dynamic obstacle to the exterior of the vehicle M until the number of dynamic obstacles present in a predetermined region around the vehicle is equal to or lower than a predetermined threshold value or until a predetermined period of time elapses.

As described with reference to FIG. 3, when the non-congested state calculation unit 16 predicts the position where the dynamic obstacle will be after a predetermined time based on the detection result by the external sensor 1 and calculates the non-congested state after the predetermined time, the intent notification control unit 18 may also perform a control to provide the intent to pass notification after a predetermined time has elapsed from the time of the prediction. In this case, the time for providing the intent to pass notification may be set to be before the predetermined time elapses so that an early intent notification may be provided.

In the below description, an example of the operation performed by the driving assistance device 100 will be described.

Figure 2:
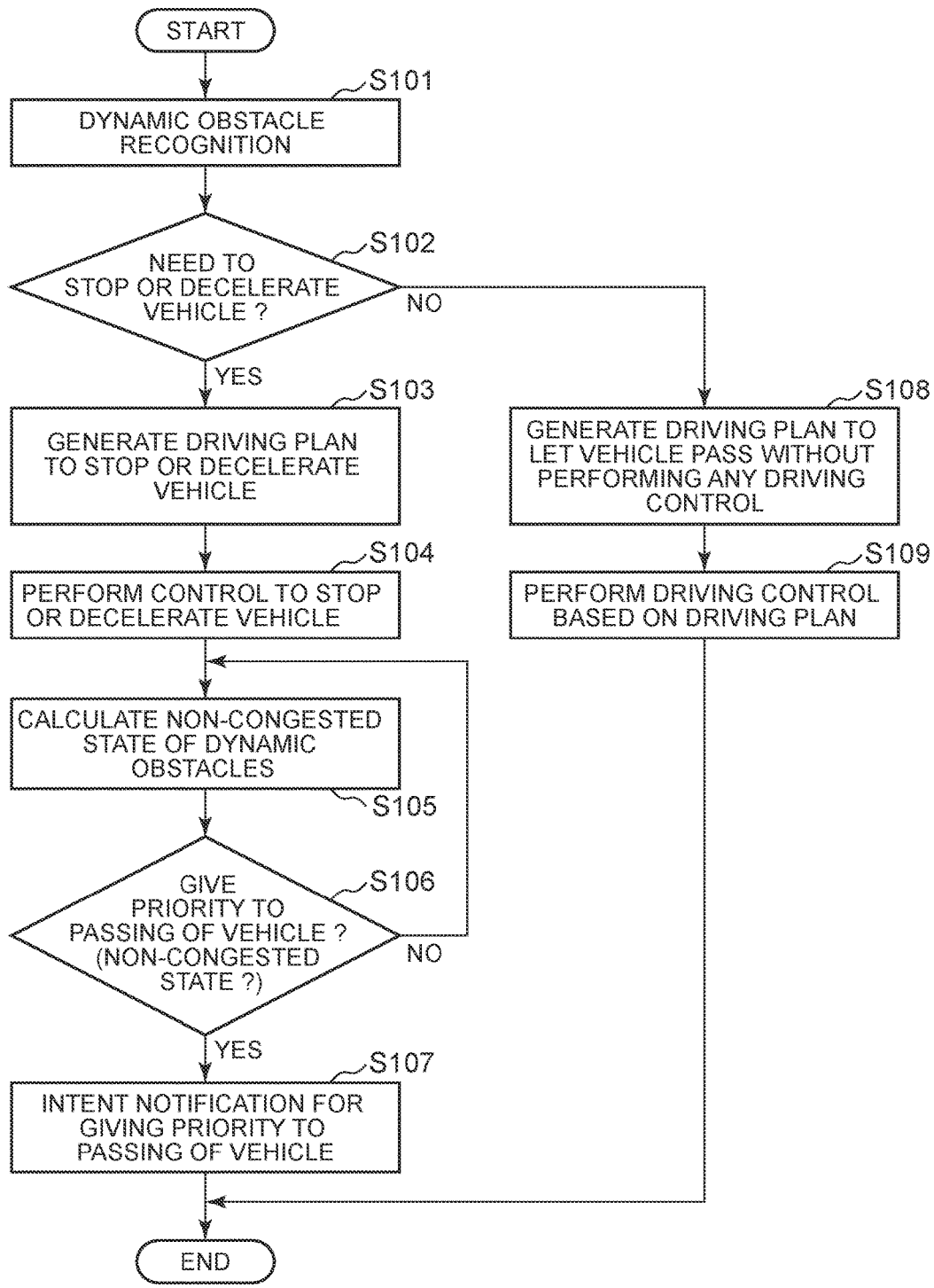
FIG. 2 is a flowchart illustrating an example of an operation performed by a driving assistance device in FIG. 1.

FIG. 2 is a flowchart illustrating an example of an operation performed by the driving assistance device 100. For example, in the driving assistance device 100, when an autonomous driving ON/OFF switch receives an operation of requesting the start of the autonomous driving, the ECU 10 performs the operation as below for the autonomous driving.

As shown in FIG. 2, the external state recognition unit 12 of the ECU 10 recognizes dynamic obstacles around the vehicle M (S101). The driving plan generation unit 14 determines whether or not the vehicle M needs to stop or decelerate based on the recognition results of the dynamic obstacles by the external state recognition unit 12 (S102). When the driving plan generation unit 14 determines that the vehicle M should stop or decelerate (S102: Yes), the ECU 10 proceeds to S103. When the driving plan generation unit 14 determines that the vehicle M does not have to stop or decelerate (S102: No), the ECU 10 proceeds to S108.

In S103, the driving plan generation unit 14 generates a driving plan to stop or decelerate the vehicle M (S103). Next, the driving control unit 15 performs a driving control to stop or decelerate the vehicle M based on the driving plan generated by the driving plan generation unit 14 in S103 (S104). On the other hand, in S108, the driving plan generation unit 14 generates a driving plan to let the vehicle M pass without performing any driving control (S108). Next, the driving control unit 15 performs the driving control to let the vehicle M pass without performing any driving control based on the driving plan generated by the driving plan generation unit 14 in S108 (S109).

The non-congested state calculation unit 16 calculates the non-congested state of the dynamic obstacles based on the detection result by the external sensor 1 (S105). Based on the non-congested state of the dynamic obstacles calculated by the non-congested state calculation unit 16, the vehicle priority determination unit 17 determines whether or not to give priority to the passing of vehicle M (S106). In S106, when the index of the non-congested state calculated by the non-congested state calculation unit 16 is equal to or lower than a predetermined threshold value X, the vehicle priority determination unit 17 determines to give priority to the passing of the vehicle M. When the vehicle priority determination unit 17 determines to give priority to the passing of the vehicle M (S106: Yes), the ECU 10 proceeds to S107. When the vehicle priority determination unit 17 determines to not give priority to the passing of the vehicle M (S106: No), the ECU 10 returns to the process of S105.

In S107, the intent notification control unit 18 controls the intent notification for giving priority to the passing of the vehicle M. After the processes of S107 or S109, the ECU 10 repeats the process of S101 while the autonomous driving control continues.

As described above, in the driving assistance device 100 of this embodiment, when the control to stop or decelerate the vehicle M is performed based on the recognition result of the dynamic obstacles while the autonomous driving control is performed, the non-congested state of the dynamic obstacles is calculated and, the determination is performed on whether or not to give priority to the passing of the vehicle M based on the calculated non-congested state. When it is determined that the passing of the vehicle M has been given priority, the intent notification may be performed to give priority to the passing of the vehicle M, thereby making it possible to reduce the time required for the vehicle to pass.

In the description of the first embodiment, the vehicle priority determination unit 17 determines whether or not to give priority to the passing of the vehicle M, but the example embodiments are not limited thereto. In the modification of the above embodiment, the vehicle priority determination unit 17 may not be necessarily provided, and the control of the intent notification for the passing of the vehicle M by the intent notification control unit 18 may be performed based on the non-congested state calculated by the non-congested state calculation unit 16. For example, the intent notification control unit 18 may determine whether or not to perform the intent notification based on the non-congested state calculated by the non-congested state calculation unit and determine the details of the control of the intent notification.

In the description of the first embodiment, an example is described in which the autonomous driving control is performed. However, the disclosure may also be applied to a manually-operated vehicle. For example, the driving plan generation unit 14 may be substituted with a component for estimating the plan of action of the vehicle based on an input operation by the driver, and the notification of intent to pass may be performed based on the estimated plan of action of the vehicle M. Alternatively, the control of the intent notification may be performed upon the detection that the vehicle M has decelerated or stopped based on an input operation by a user, or speed or acceleration information of the vehicle M obtained from an internal sensor 3. In this case, the processes of the driving plan generation unit 14 and the driving control unit 15 in FIG. 1 and the processes of S102, S103, S104, S108, and S109 in FIG. 2 are performed by the driver. When the vehicle M is manually operated, a passenger of the vehicle M may be provided with information when the notification of the intent to pass is performed so that the passenger of the vehicle M may easily recognize the situation.

Second Embodiment

In the below description, the second embodiment will be described. In this description, the difference between the second embodiment and the first embodiment will be described.

Figure 4:
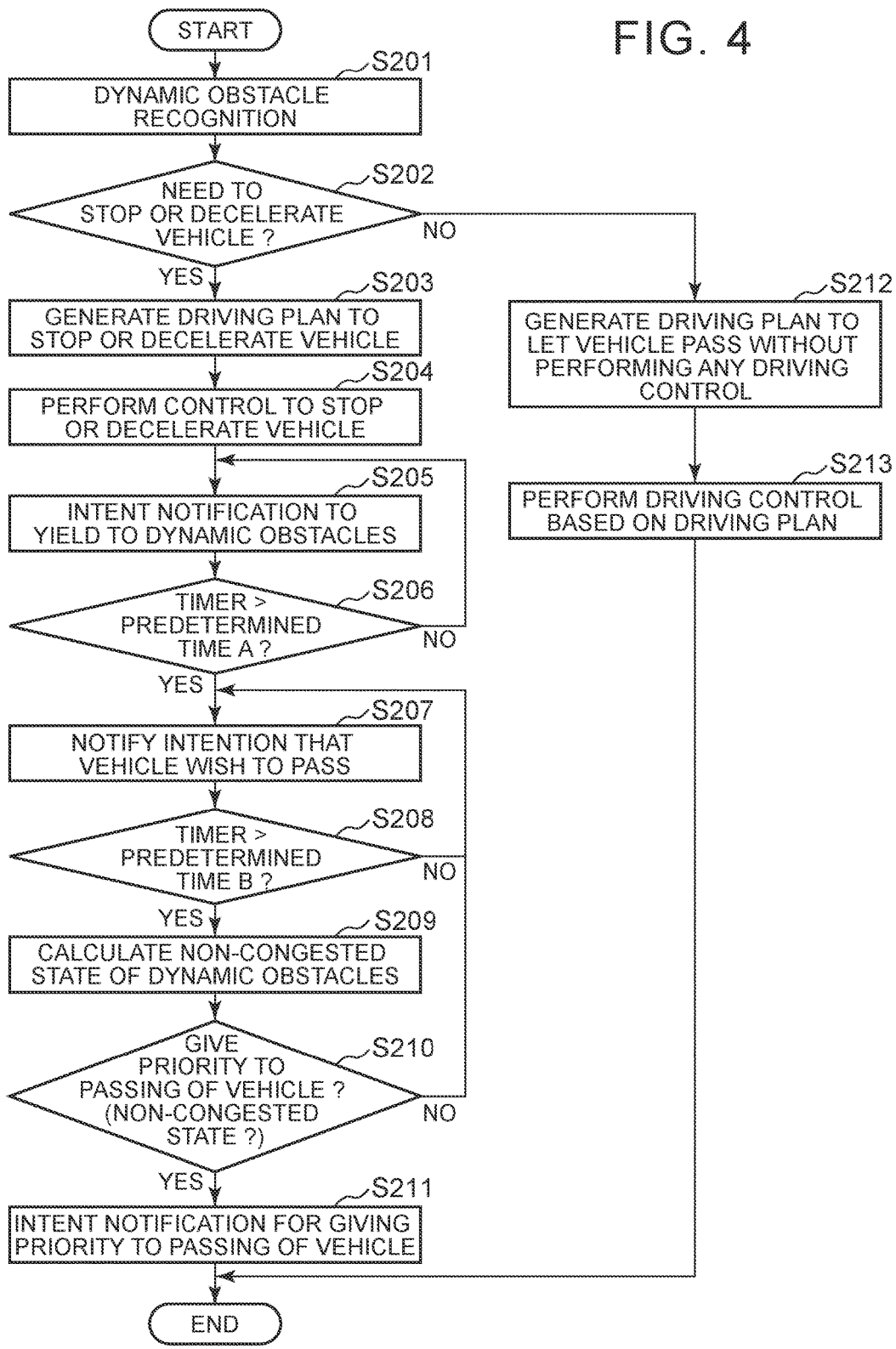
FIG. 4 is a flowchart illustrating an example of an operation performed by the driving assistance device of a second embodiment.

FIG. 4 is a flowchart illustrating one example of the operation for the autonomous driving performed by the driving assistance device 100. When, for example, the autonomous driving ON/OFF switch receives an operation of requesting the start of the autonomous driving, the driving assistance device 100 controls the ECU 10 to perform the following operation for the autonomous driving.

As shown in FIG. 4, the external state recognition unit 12 of the ECU 10 recognizes dynamic obstacles around the vehicle M (S201). The driving plan generation unit 14 determines whether or not the vehicle M needs to stop or decelerate based on the recognition result of the dynamic obstacles by the external state recognition unit 12 (S202). When the driving plan generation unit 14 determines that the vehicle M needs to stop or decelerate (S202: Yes), the ECU 10 proceeds to S203. When the driving plan generation unit 14 determines that the vehicle M does not have to stop or decelerate (S202: No), the ECU 10 proceeds to S212.

In S203, the driving plan generation unit 14 generates a driving plan to stop or decelerate the vehicle M (S203). Next, the driving control unit 15 performs the driving control to stop or decelerate the vehicle M based on the driving plan generated by the driving plan generation unit 14 in S203 (S204). On the other hand, in S212, the driving plan generation unit 14 generates a driving plan that does not stop or decelerate the vehicle M (S212). Next, the driving control unit 15 performs the driving control that does not stop or decelerate the vehicle M based on the driving plan generated by the driving plan generation unit 14 in S212 (S213).

In S205, the intent notification control unit 18 performs, after the driving control in S204 to stop or decelerate the vehicle M is performed, the control of the notification of intent to yield to the dynamic obstacles (S205). Also, the remaining time during which the vehicle M will yield to the dynamic obstacles may be notified as the details of the intent notification to be controlled.

In S206, when the time that has elapsed since the start of the process of S205 exceeds a predetermined time A, the intent notification control unit 18 proceeds to S207 (S206: Yes). The elapsed time refers to the time that has elapsed since the vehicle M stopped or decelerated to a speed equal to or lower than a predetermined vehicle speed due to the stopping or decelerating control in S204. On the other hand, in S206, if the time that has elapsed since the start of the process of S205 does not exceed the predetermined time A, S206 is repeated (S206: No).

In S207, after the predetermined time A is exceeded in S206, the intent notification control unit 18 performs the control of the intent notification to inform the dynamic obstacles that the vehicle M wishes to pass (S207). Also, the remaining time during which the vehicle M will perform the intent notification to give priority to the passing of the vehicle itself may be notified as the details of the intent notification to be controlled.

In S208, when the time that has elapsed since the start of the process of S207 exceeds the predetermined time B (S208: Yes), the intent notification control unit 18 proceeds to S209. On the other hand, in S208, if the time that has elapsed since the start of the process of S207 does not exceed the predetermined time B (S208: No), S207 is repeated.

The non-congested state calculation unit 16 calculates the non-congested state of the dynamic obstacles based on the detection result by the external sensor 1 (S209). The vehicle priority determination unit 17 determines whether or not to give priority to the passing of the vehicle M based on the non-congested state of the dynamic obstacles calculated by the non-congested state calculation unit (S210). When the vehicle priority determination unit 17 determines to give priority to the passing of the vehicle M (S210: Yes), the ECU 10 proceeds to S211. When the vehicle priority determination unit 17 determines to not give priority to the passing of the vehicle M (S210: No), the ECU 10 returns to the process of S207.

In S211, the intent notification control unit 18 performs a control of a notification of intent to give priority to the passing of the vehicle M. After the process of S211 or S213, the ECU 10 repeats the process of S201 while the autonomous driving control is continued.

As described above, in the driving assistance device 100 of the embodiment, after the notification that the vehicle M wishes to pass (pre-notification) is performed after a predetermined period of time during which the notification to yield to the surrounding dynamic obstacles is performed, the notification of intent to pass is performed based on the non-congested state. Accordingly, the dynamic obstacles around the vehicle M may understand the intent of the vehicle M more clearly.

Third Embodiment

In the below description, the third embodiment will be described. In this description, a difference between the third embodiment and the first embodiment will be described.

Figure 5:
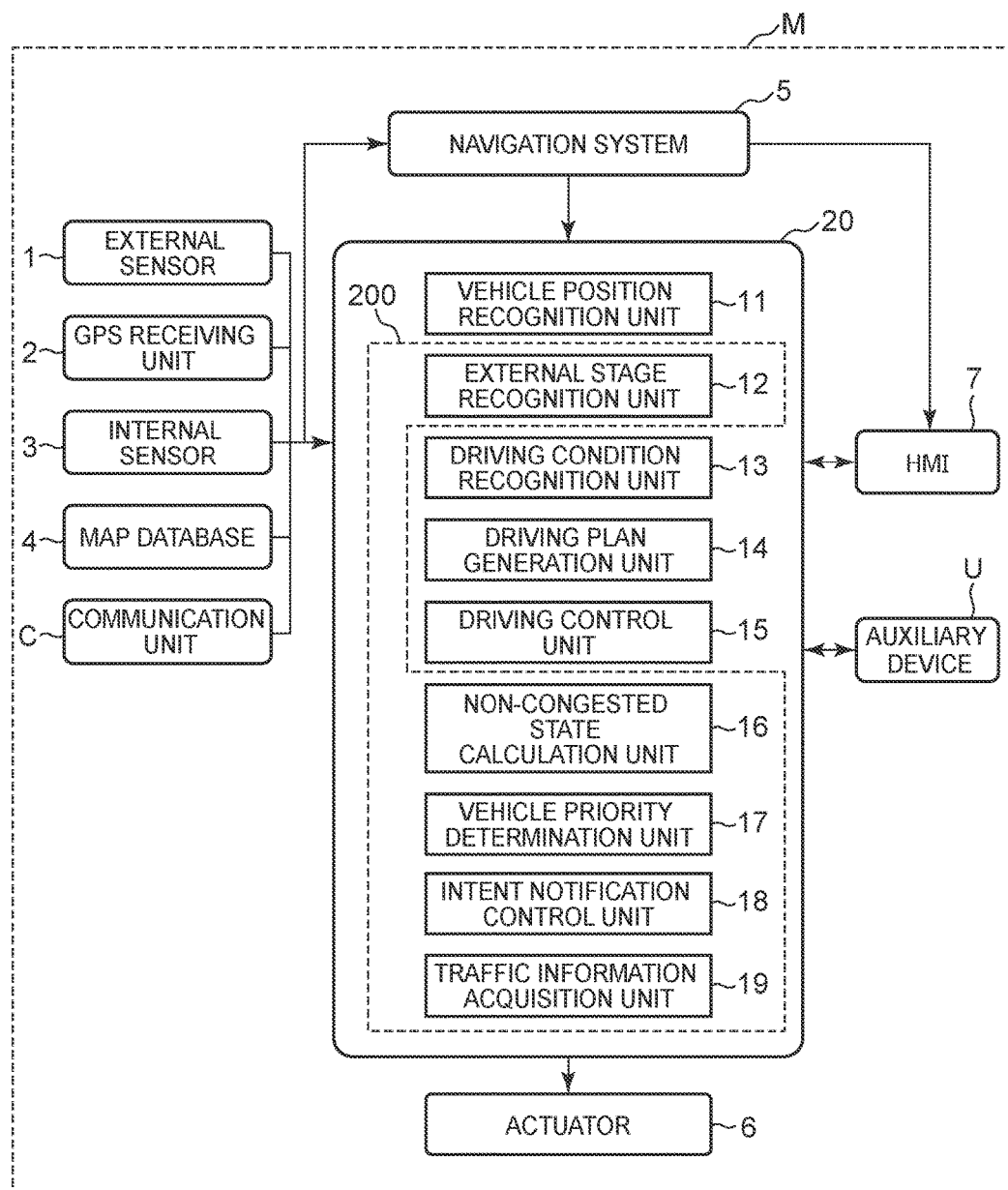
FIG. 5 is a block diagram illustrating the configuration of the driving assistance device of a third embodiment.

FIG. 5 is a block diagram illustrating an ECU 20 in a driving assistance device 200 according to the third embodiment. As shown in FIG. 5, the driving assistance device 200 of the this embodiment is different from the first embodiment in that the driving assistance device 200 has a traffic information acquisition unit 19 and the ECU 20 is connected to a communication unit C.

The traffic information acquisition unit 19 acquires traffic information on the traffic around the vehicle M. The traffic information is about a traffic congestion situation around the vehicle M or the number of vehicles following the vehicle M, for example.

The communication unit C receives and sends information through communication with the exterior of the vehicle M. The information received by the communication unit C may include, for example, local or wide-area traffic information distributed from an external center, driving information on other vehicles sent from other vehicles, or a sensor detection result.

The traffic information acquisition unit 19 may, for example, acquire information on the traffic congestion around the vehicle M based on the detection result by the external sensor 1. The traffic information acquisition unit 19 may also acquire information on, for example, the number of following vehicles or the traffic congestion using the information received by the communication unit C.

When the traffic information acquisition unit 19 acquires the information on the traffic around the vehicle M, the vehicle priority determination unit 17 determines whether or not to give priority to the passing of the vehicle M based on the acquired traffic information and the non-congested state calculated by the non-congested state calculation unit 16. For example, when the traffic information acquisition unit 19 acquires traffic information in which the number of vehicles following the vehicle M is a predetermined value or more, the vehicle priority determination unit 17 determines to give priority to the passing of the vehicle even in a more congested state (i.e., in a state where more dynamic obstacles are present) compared to a case where such traffic information is not acquired. As a result, when there is congestion behind the vehicle M, for example, the operations to facilitate priority of the passing of vehicle M are performed, thereby making it possible to ease the congestion behind the vehicle M.

The traffic information used by the vehicle priority determination unit 17 may also be, for example, on the traffic situation around the vehicle M, wide-area traffic information, or the time required for the vehicle M to reach a destination. Depending on the type of traffic information to be used, the vehicle priority determination unit 17 may change a threshold value of the non-congested state used for the determination or a control mode. For example, when the traffic information is regarding congestion behind the vehicle M, a control to increase the threshold value of the non-congested state used for the determination may be performed, or a control to move the vehicle at low speed may be performed in addition to a visual or auditory notification of intent to pass.

FIG. 6 is a flowchart illustrating one example of the process of the autonomous driving performed by the driving assistance device 200. When the autonomous driving ON/OFF switch receives an operation of requesting the start of the autonomous driving, the driving assistance device 200 controls the ECU 20 to perform the below operation for the autonomous driving.

As shown in FIG. 6, the external state recognition unit 12 of the ECU 20 recognizes the dynamic obstacles around the vehicle M (S301). The driving plan generation unit 14 determines whether or not to stop or decelerate the vehicle M based on the recognition result of the dynamic obstacles by the external state recognition unit 12 (S302). When the driving plan generation unit 14 determines that the vehicle M needs to be stopped or decelerated (S302: Yes), the ECU 20 proceeds to S303. When the driving plan generation unit 14 determines that there is no need to stop or decelerate the vehicle M (S302: No), the ECU 20 proceeds to S311.

In S303, the driving plan generation unit 14 generates a driving plan to stop or decelerate the vehicle M (S303). Next, the driving control unit 15 performs the driving control to stop or decelerate the vehicle M based on the driving plan generated by the driving plan generation unit 14 in S203 (S304). On the other hand, in S311, the driving plan generation unit 14 generates a driving plan to let the vehicle M to pass without performing any driving control (S311). Next, the driving control unit 15 performs the driving control to let the vehicle M pass without performing any driving control based on the driving plan generated by the driving plan generation unit 14 in S311 (S312).

The non-congested state calculation unit 16 calculates the non-congested state of the dynamic obstacles based on the detection result by the external sensor 1 (S305). The vehicle priority determination unit 17 determines whether or not the non-congested state of the dynamic obstacles calculated by the non-congested state calculation unit exceeds a predetermined threshold value X (S306). When the vehicle priority determination unit 17 determines that the non-congested state of the dynamic obstacles exceeds the predetermined threshold value X (S306: Yes), the ECU 20 proceeds to S310. When the vehicle priority determination unit 17 determines that the non-congested state of the dynamic obstacles does not exceed the predetermined threshold value X (S306: No), the ECU 20 proceeds to S307.

In S307, the traffic information acquisition unit 19 acquires information on the traffic around the vehicle M (S307). In addition, the traffic information acquisition unit 19 determines, for example, whether or not there is congestion behind the vehicle M (S308). When the traffic information acquisition unit 19 determines that there is congestion behind the vehicle M (S308: Yes), the ECU 20 proceeds to S310. When the traffic information acquisition unit 19 determines that there is no congestion behind the vehicle M (S308: No), the ECU 20 returns to the process of S305.

In S310, the intent notification control unit 18 performs a control of a notification of intent to give priority to the passing of the vehicle M. After the processes of S310 or S312, the ECU 20 repeats the process of S301 while the autonomous driving control is continued.

As described above, in the driving assistance device 200 according to this embodiment, when the control to stop or decelerate the vehicle M is performed based on the recognition result of the dynamic obstacles while the autonomous driving control is being performed, the non-congested state of the dynamic obstacles is calculated, and it is determined whether or not to give priority to the passing of the vehicle M based on the calculated non-congested state and the traffic information. When it is determined that the passing of the vehicle M is given priority, the intent notification may be performed for giving priority to the passing of vehicle M. Accordingly, it becomes possible to reduce the time required for the vehicle to pass.

As aforementioned, the embodiments of the present disclosure have been described. However, the present disclosure is not limited to the above embodiments and may be embodied in various forms. For example, the present disclosure can be applied to vehicles having various support levels regardless of whether the vehicle M is an autonomous vehicle or a manually-operated vehicle.

What is claimed is:

1. A driving assistance device configured to assist driving of a vehicle, the driving assistance device comprising:
   one or more processors programmed to:
   while the vehicle is decelerating or stopped, calculate a non-congested state of a plurality of dynamic obstacles around the vehicle; and
   control a notification device such that a notification of intent of the vehicle to pass is performed based on the non-congested state calculated.

2. The driving assistance device according to claim 1, further comprising an actuator configured to control behavior of the vehicle based on the non-congested state, wherein the actuator performs a control to move the vehicle forward at a speed equal to or lower than a predetermined speed based on the non-congested state.

3. The driving assistance device according to claim 1, wherein the one or more processors are further programmed acquire traffic information on traffic around the vehicle, and control the notification of intent of the vehicle to pass based on the traffic information on traffic around the vehicle.

4. The driving assistance device according to claim 1, wherein the one or more processors are further programmed to calculate the non-congested state by using the number of dynamic obstacles present in a predetermined region around the vehicle.

5. The driving assistance device according to claim 1, wherein the one or more processors are further programmed to perform a control of a notification of intent to yield to the dynamic obstacles before the non-congested state of the plurality of dynamic obstacles is calculated.

6. The driving assistance device according to claim 1, wherein the one or more processors are further programmed to:
   recognize the plurality of dynamic obstacles around the vehicle;
   perform a driving control of the vehicle based on a recognition result of the plurality of dynamic obstacles around the vehicle,
   wherein the vehicle is decelerated or stopped by the driving control.

7. The driving assistance device according to claim 1, wherein the non-congested state is based on a calculation of a ratio of an area occupied by dynamic obstacles within a predetermined region around the vehicle.

8. A non-transitory computer readable storage medium storing a program, the program including instructions that, when executed by a processor, cause the processor to:
   while the vehicle is decelerating or stopped, calculate a non-congested state of a plurality of dynamic obstacles around a vehicle, and
   control a notification device for performing a notification of intent of the vehicle to pass based on the calculated non-congested state.

* * * * *